(12) United States Patent
Morita

(10) Patent No.: US 7,156,336 B2
(45) Date of Patent: Jan. 2, 2007

(54) REEL

(75) Inventor: Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/240,359

(22) Filed: Oct. 3, 2005

(65) Prior Publication Data

US 2006/0032962 A1 Feb. 16, 2006

Related U.S. Application Data

(62) Division of application No. 10/455,633, filed on Jun. 6, 2003, now Pat. No. 6,962,305.

(30) Foreign Application Priority Data

Jun. 7, 2002 (JP) ............................. 2002-166609

(51) Int. Cl.
G11B 23/107 (2006.01)

(52) U.S. Cl. .................... 242/348; 242/610.4; 360/132

(58) Field of Classification Search ................ 242/345, 242/345.2, 348, 348.2, 610.4, 610.5, 610.6, 242/613.4, 613.5; 360/132
See application file for complete search history.

(56) References Cited

U.S. PATENT DOCUMENTS 3,625,455 A    12/1971  Streets
6,318,659 B1   11/2001  Zwettler et al.
6,478,244 B1   11/2002  Zwettler et al.

Primary Examiner—John Q. Nguyen
(74) Attorney, Agent, or Firm—Sughrue Mion, PLLC

(57) ABSTRACT

A reel has: a cylindrical hub, which is molded of a resin material, and around which a recording tape is wound; a pair of flanges provided at end portions of the hub, and holding transverse direction end portions of the recording tape; and a ring-shaped member formed of metal and disposed at an inner side of the hub, at least one portion of an outer peripheral surface of the ring-shaped member contacting an inner peripheral surface of the hub. The ring-shaped member of the reel contacts a substantially central portion, in a heightwise direction, of the inner peripheral surface of the hub.

6 Claims, 9 Drawing Sheets

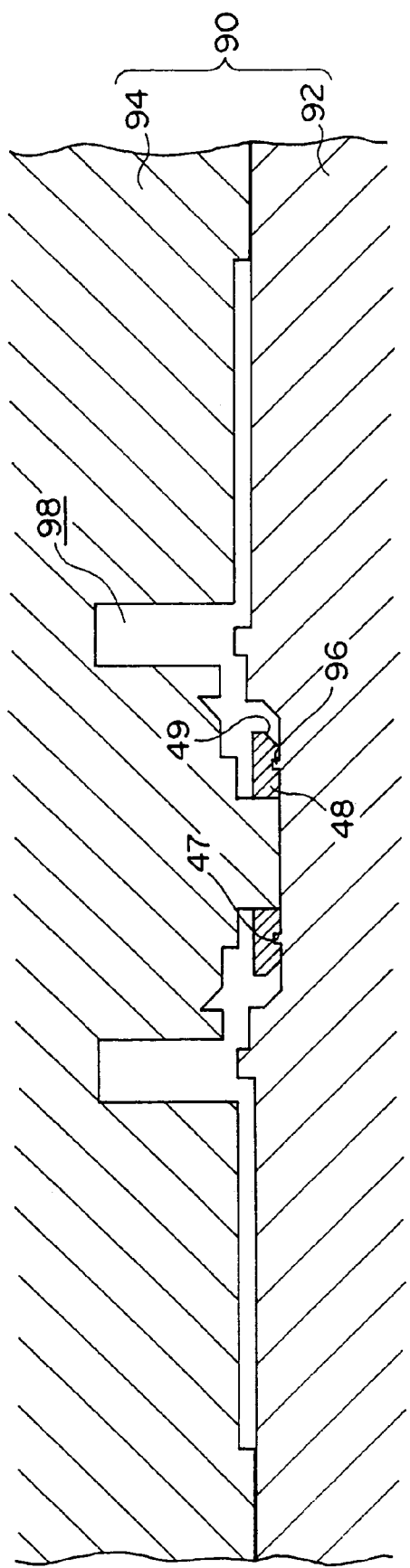

REEL

CROSS-REFERENCE TO RELATED APPLICATION

This is a Divisional of application Ser. No. 10/455,633 filed Jun. 6, 2003 now U.S. Pat. No. 6,962,305. The entire disclosure of the prior application Ser. No. 10/455,633 is hereby incorporated by reference.

This application claims priority under 35 USC 119 from Japanese Patent Application No. 2002-166609, the disclosure of which is incorporated by reference herein.

BACKGROUND OF THE INVENTION

1. Field of the Invention

The present invention relates to a reel on which is wound a recording tape, such as a magnetic tape or the like, used for storing data of a computer or the like.

2. Description of the Related Art

Conventionally, among recording tape cartridges used as recording media utilized in external storage devices of computers and the like, there is a type in which a single reel, on which a recording tape such as a magnetic tape or the like is wound, is rotatably accommodated within a recording tape cartridge. The magnetic tape is used for storing data of a computer or the like, and important information is recorded thereon. Thus, the recording tape cartridge is structured such that the magnetic tape cannot be inadvertently pulled out therefrom when the recording tape cartridge is not being used (such as when the recording tape cartridge is being stored or the like), and also, so that trouble such as jamming of the tape or the like will not occur.

Recently, the storage capacity of recording tape cartridges has increased such that the amount of data which can be recorded has increased from several tens of gigabytes (GB) to several hundred GB. In order to realize such an increase in storage capacity, the track pitch width has been decreased, or the thickness of the magnetic tape has been decreased. However, high dimensional accuracy is therefore required of the recording tape cartridge itself as well. In particular, the dimensions and the configuration of the reel on which the magnetic tape is wound must be highly accurate.

However, at a reel, both the cylindrical hub on which the magnetic tape is wound, and the upper and lower flanges which are provided at the upper and lower end portions of the hub and which hold the transverse direction end portions of the magnetic tape wound around the hub, are molded of a resin material. Thus, there are cases in which slight deformation occurs due to changes in temperature and/or humidity at the time when the recording tape cartridge is being transported. When such deformation arises at the hub in particular, a problem arises in that a fair amount of the magnetic tape is adversely affected thereby, i.e., bending due to this deformation of the hub arises at the magnetic tape itself.

In order to improve the dimensional accuracy of the reel, there has been the proposal to fit a ring-shaped member formed of metal on the outer side of the hub which is formed of resin. However, when the temperature becomes high, time is required for the temperature at the outer surface (the outer peripheral surface) of the ring-shaped member to drop, and there is the concern that the magnetic tape may be adversely affected by the temperature.

SUMMARY OF THE INVENTION

In view of the aforementioned, an object of the present invention is to provide a reel in which the high accuracy of the dimensions and the configuration of a hub can be maintained, regardless of changes in the environment such as the temperature, the humidity, or the like.

In order to achieve the above object, a first aspect of the present invention provides a reel which comprises: a cylindrical hub, which is molded of a resin material, and around which a recording tape is wound; a pair of flanges provided at end portions of the hub, and holding transverse direction end portions of the recording tape; and a ring-shaped member formed of metal and disposed at an inner side of the hub, at least one portion of an outer peripheral surface of the ring-shaped member contacting an inner peripheral surface of the hub.

In accordance with the above-described structure, even if the hub which is made of resin attempts to deform due to changes in the environment such as the temperature, the humidity or the like, deformation of the hub is suppressed by the ring-shaped member which is formed of metal and which is disposed such that at least a portion of the outer peripheral surface of the ring-shaped member contacts the inner peripheral surface of the hub. Further, in the same way, even if the recording tape contracts in the winding/tightening direction (the radial direction of the hub) due to changes in the environment such as the temperature, the humidity or the like, deformation of the hub due to contracting of the recording tape is suppressed because the strength of the hub is improved by the ring-shaped member which is formed of metal. Accordingly, it is possible to obtain a hub whose dimensions and configuration can be maintained highly accurate, and the recording tape wound on the hub is not adversely affected.

In the first aspect, the ring-shaped member contacts a substantially central portion, in a heightwise direction, of the inner peripheral surface of the hub.

It suffices for at least one portion of the outer peripheral surface of the ring-shaped member which is formed of metal to contact the substantially central portion, in the heightwise direction, of the inner peripheral surface of the hub. Namely, in this case, even if the hub attempts to deform due to some effect (cause), deformation at the central portion of the hub is suppressed by the ring-shaped member. In this way, even if the hub deforms, the hub becomes substantially barrel-shaped. Accordingly, vertical direction shifting of the recording tape wound on the hub can be suppressed. Moreover, the wound posture of the recording tape is good, and the conveying of the recording tape when loaded in a drive device can be stabilized.

A second aspect of the present invention provides a method of manufacturing a reel accommodated in a recording tape cartridge, the method comprising the steps of: (a) molding a cylindrical hub of a resin material; (b) forming a first flange integrally with one end portion of the hub; (c) placing a ring-shaped member formed of metal at an inner side of the hub; and (d) joining a second flange to another end portion of the hub.

A third aspect of the present invention provides a recording tape cartridge which comprises: (a) a case having an opening; and (b) at least one reel accommodated in the case and having a cylindrical hub, which is, which is molded of a resin material, and around which a recording tape is wound; a pair of flanges provided at end portions of the hub, and holding transverse direction end portions of the recording tape; and a ring-shaped member formed of metal and disposed at an inner side of the hub, at least one portion of an outer peripheral surface of the ring-shaped member contacting an inner peripheral surface of the hub.

BRIEF DESCRIPTION OF THE DRAWINGS

FIG. 6 is a schematic side sectional view showing a mold for molding a reel hub and a lower flange of the reel relating to the embodiment of the present invention.

DETAILED DESCRIPTION OF THE INVENTION

Hereinafter, a reel relating to an embodiment of the present invention will be described on the basis of the drawings. Note that the reel relating to the present invention may be applied to a one-reel-type recording tape cartridge in which a single reel is accommodated within a case, or to a two-reel-type recording tape cartridge in which a pair of reels are accommodated within a case. Here, explanation will be given by using, as an example, a one-reel-type recording tape cartridge. Moreover, for convenience of explanation, the direction of loading the recording tape cartridge into a drive device is called the forward direction, and the front-back, left-right, and top-bottom directions are expressed on the basis of this forward direction. Moreover, a magnetic tape is used as the recording tape, and hereinafter, explanation will be given of a magnetic tape cartridge 10.

Figure 1:
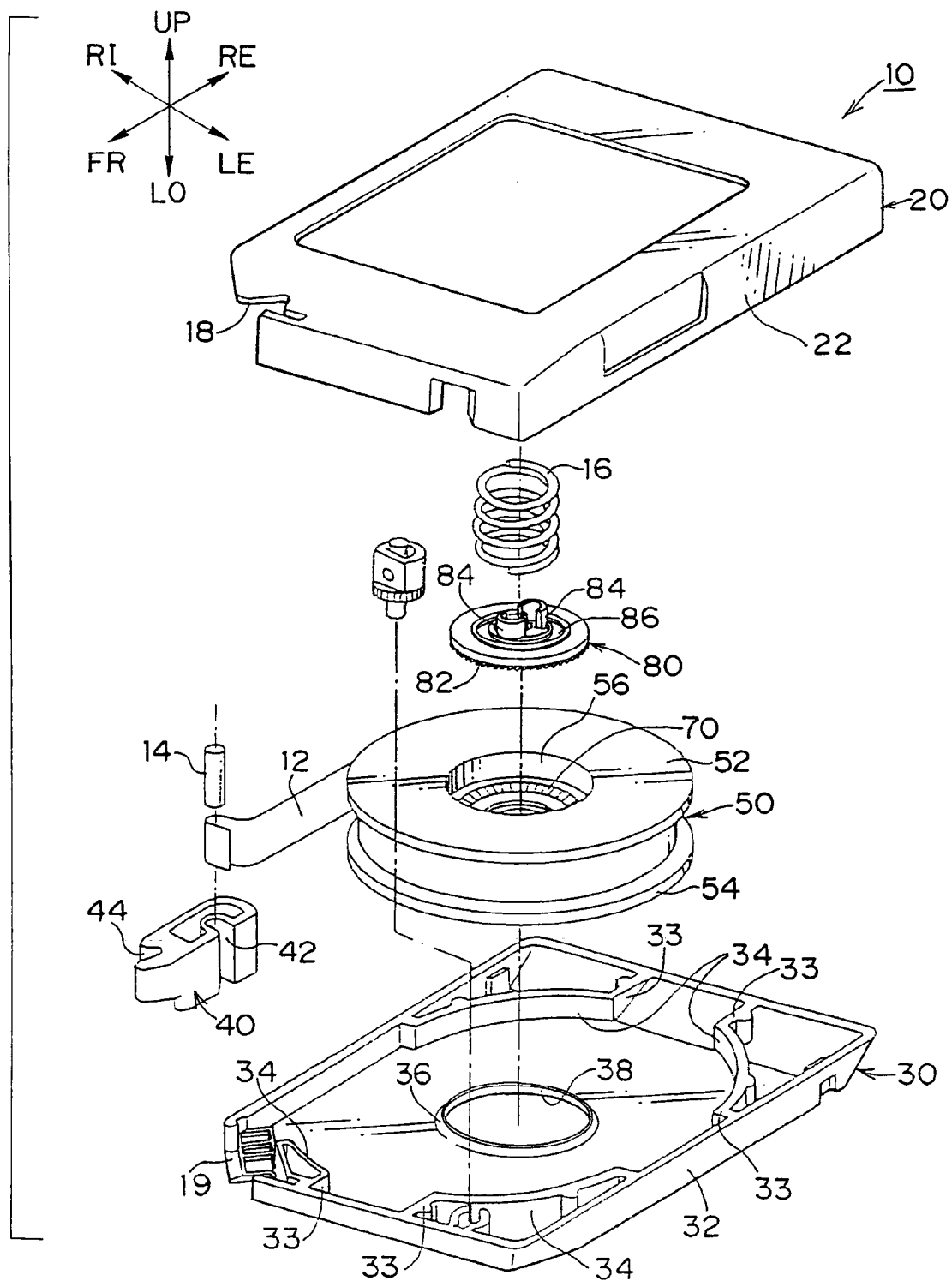
FIG. 1 is an exploded perspective view of a magnetic tape cartridge having a reel relating to an embodiment of the present invention.
Figure 2:
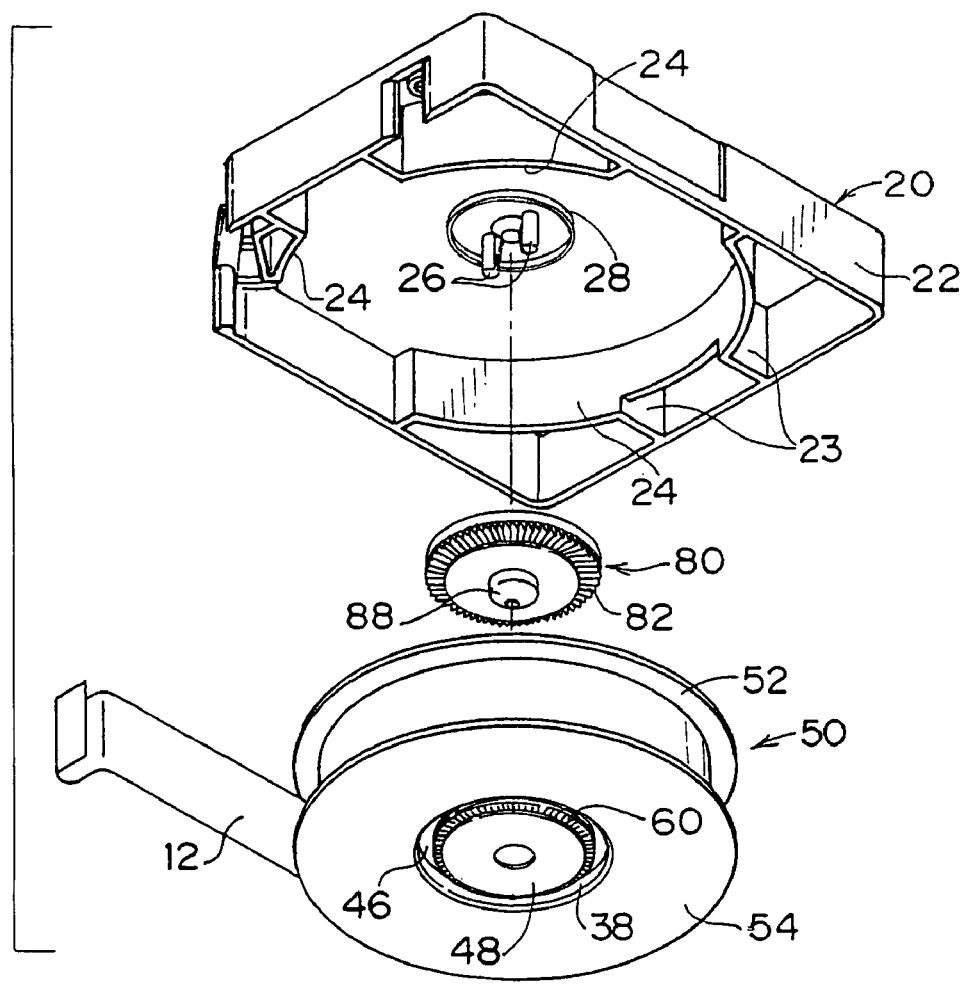
FIG. 2 is a perspective view, as seen from below, of the reel of FIG. 1, a braking member, and an upper case.
Figure 3:
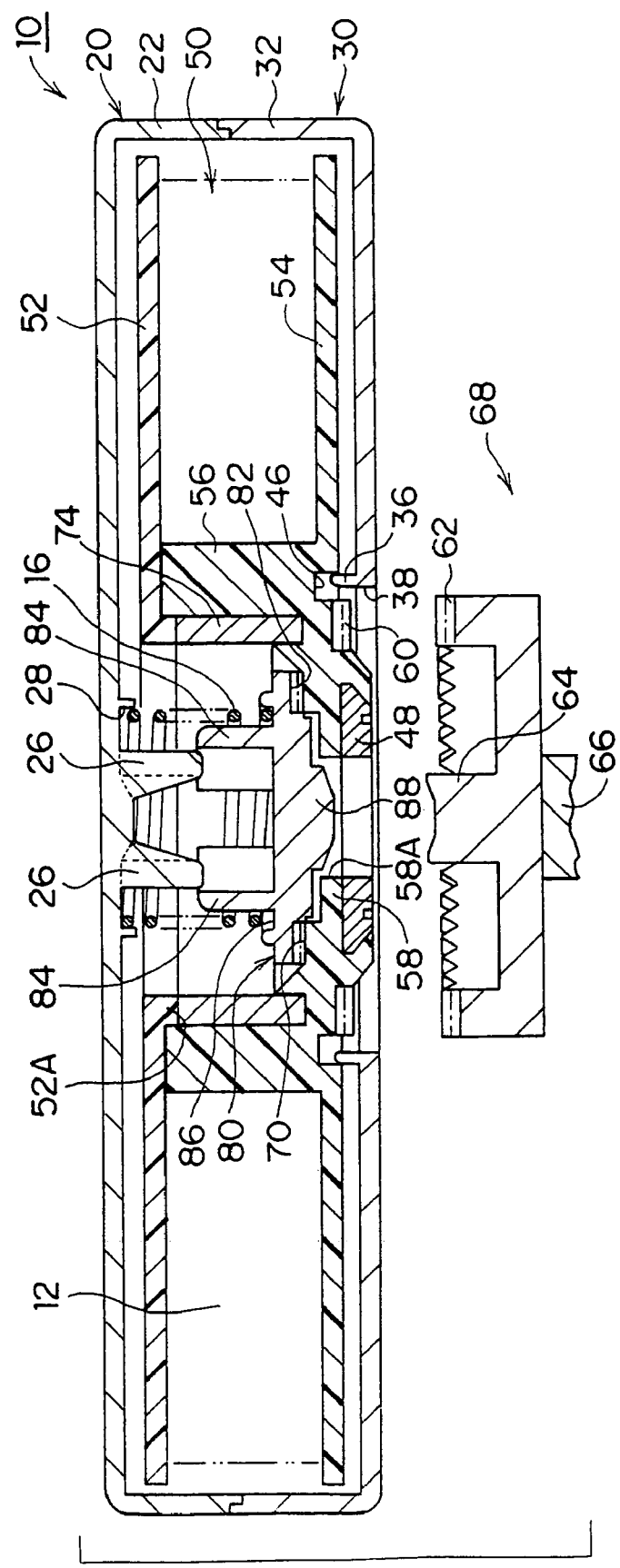
FIG. 3 is a side sectional view of a driving device of a drive device and the magnetic tape cartridge which has the reel of FIG. 1.

First, the overall structure of the magnetic tape cartridge 10 will be described. As shown in FIGS. 1 through 3, the magnetic tape cartridge 10 has an upper case 20 and a lower case 30 which are formed of a synthetic resin. The magnetic tape cartridge 10 is formed in a substantially rectangular box shape by peripheral walls 22, 32 of the upper case 20 and the lower case 30 being welded together by ultrasonic welding or the like. Play restricting walls 24, 34 stand erect at the inner surfaces of the upper case 20 and the lower case 30, respectively. The inner diameters of the play restricting walls 24, 34 are formed to be slightly larger than the outer diameters of an upper flange 52 and a lower flange 54 of a reel 50. The reel 50 is rotatably accommodated at the inner sides of the play restricting walls 24, 34.

A plurality of ribs 23 are provided between the play restricting wall 24 and the peripheral wall 22 of the upper case 20. A plurality of ribs 33 are provided between the play restricting wall 34 and the peripheral wall 32 of the lower case 30. The play restricting wall 24 and the peripheral wall 22 are connected by the ribs 23, and the play restricting wall 34 and the peripheral wall 32 are connected by the ribs 33. The play restricting walls 24, 34 and the peripheral walls 22, 32 are thereby strengthened.

The reel 50 is structured by a reel hub 56 which is cylindrical and formed of a synthetic resin, and the upper flange 52 and the lower flange 54 which are provided at the end portions of the reel hub 56. The widthwise direction end portions of a magnetic tape 12, which serves as an information recording/playback medium wound on the reel hub 56, are held at the upper flange 52 and the lower flange 54.

A bottom wall 58 is provided at the lower flange 54 of the reel hub 56. A hole portion 58A is formed in the center of the bottom wall 58. An annular reel gear 60 is provided so as to project out from the bottom wall 58 at the bottom surface side of the bottom wall 58. The reel gear 60 can emerge from a circular open hole 38 provided at the center of the lower case 30, and meshes with a driving gear 62 provided at a drive device 68 so as to transmit rotational force to the reel 50.

An annular metal plate 48 is provided integrally with the inner side of the reel gear 60. Due to the metal plate 48 being attracted by a magnet (not shown) provided at the drive device 68, axial offset is prevented, and the meshed-together state of the reel gear 60 and the driving gear 62 can be maintained. On the other hand, an annular groove 46 is provided at the outer side of the reel gear 60. The reel 50 is positioned with respect to the lower case 30 due to a rib 36, which stands erect at the peripheral edge portion of the open hole 38, being inserted into the annular groove 46.

Further, an annular reel gear 70 is formed at the top surface side of the bottom wall 58 of the reel hub 56. The reel gear 70 can mesh with a braking gear 82 which is formed at the outer peripheral portion of the bottom surface of a substantially disc-shaped braking member 80 which can be accommodated within the reel hub 56. Ribs 84, which are substantially U-shaped as seen in plan view (and are referred to hereinafter as "U-shaped ribs"), stand erect at the top surface of the braking member 80 such that the open sides thereof oppose each other. On the other hand, a pair of anchor pins 26 are provided vertically at the center of the inner surface of the upper case 20, and can engage with the U-shaped ribs 84.

An annular groove 86 is provided at the outer side of the U-shaped ribs 84 of the braking member 80. An annular projection 28 projects at the outer side of the anchor pins 26 of the upper case 20. A spring 16 is provided between the braking member 80 and the upper case 20 by being held between the annular projection 28 and the annular groove 86.

Accordingly, when the magnetic tape cartridge 10 is not being used, the anchor pins 26 are inserted into the U-shaped ribs 84, such that rotation of the braking member 80 is impeded. The braking gear 82 of the braking member 80 whose rotation has been impeded is urged toward the reel gear 70, and strongly meshes with the reel gear 70 within the reel hub 56. In this way, inadvertent rotation of the reel 50 is prevented.

On the other hand, a projection 88, which is substantially solid-cylindrical and which can be inserted through the hole portion 58A, is provided at the center of the bottom surface of the braking member 80. Before the reel gear 60 meshes with the driving gear 62 and rotational force is transmitted to the reel 50, a meshing releasing pin 64, which is provided at the distal end portion of a rotating shaft 66 provided at the drive device 68, abuts the projection 88. Due to the meshing releasing pin 64 abutting the projection 88, the braking member 80 is pushed upward against the urging force of the spring 16, and the meshing of the braking gear 82 and the reel gear 70 is released. In this way, the reel 50 is able to rotate.

Further, a leader block 40 is attached to the distal end portion of the magnetic tape 12 due to an elastic pin 14 and the distal end of the magnetic tape 12 being fit into a concave portion 42 of the leader block 40. Opening portions 18, 19 are formed at the front right corner portions of the peripheral wall 22 of the upper case 20 and the peripheral wall 32 of the lower case 30, respectively.

The opening portions 18, 19 are for enabling the magnetic tape 12, which is wound on the reel 50, to be pulled out to the exterior. An unillustrated pull-out pin provided at the drive device engages with an engagement portion 44 formed at the distal end of the leader block 40, and pulls the leader block 40 out from the opening portions 18, 19, and fits the leader block 40 in a take-up reel (not shown) provided at the drive device.

When the leader block 40 is fit into the take-up reel, the reel 50 and the take-up reel are driven to rotate synchronously. In this way, data is recorded onto the magnetic tape 12 or data recorded on the magnetic tape 12 is played back, while the magnetic tape 12 is successively taken-up onto the take-up reel. Further, when the magnetic tape cartridge 10 is not being used, the leader block 40 is anchored at the peripheral edges of the opening portions 18, 19 and closes the opening portions 18, 19.

Figure 4:
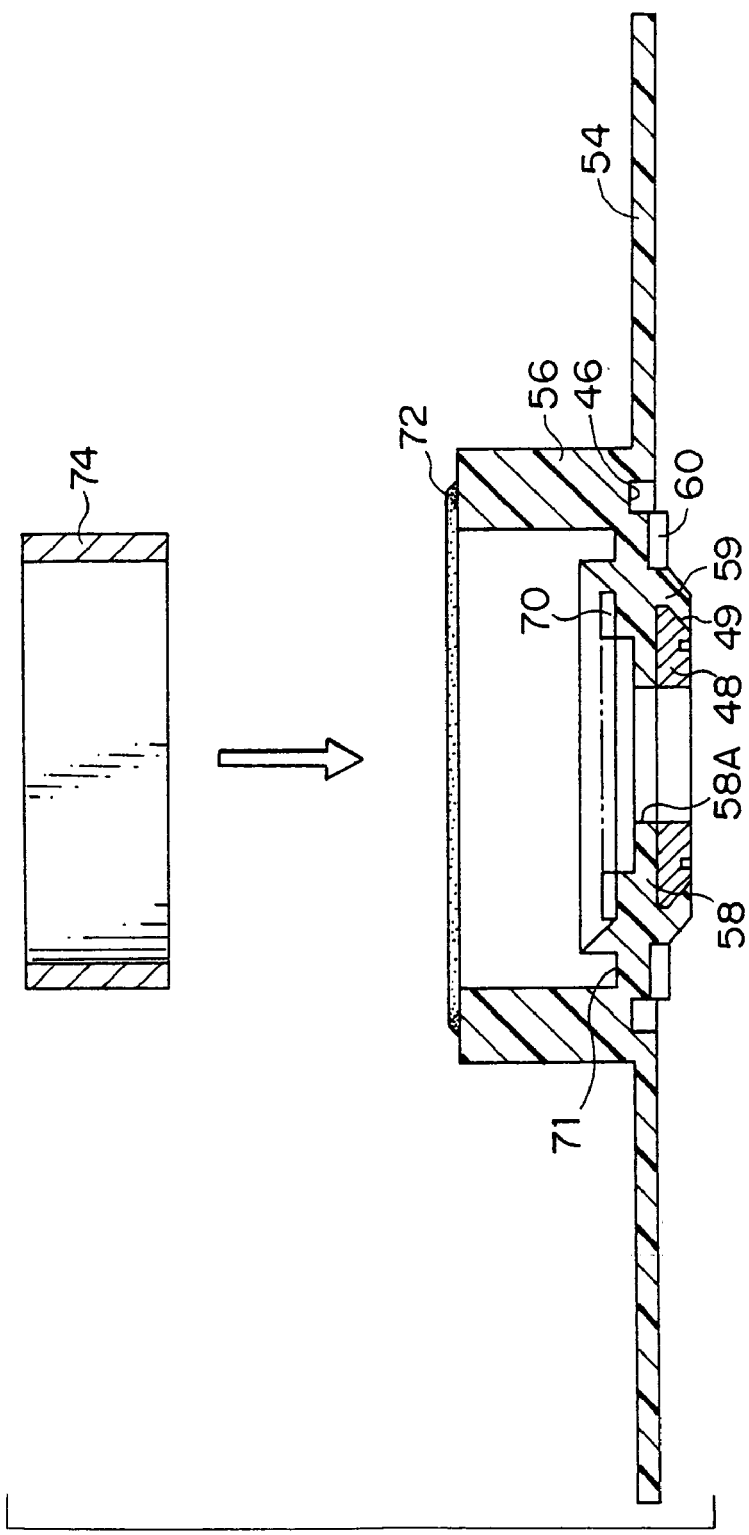
FIG. 4 is an exploded side sectional view of the reel of FIG. 1, from which an upper flange has been removed.
Figure 5:
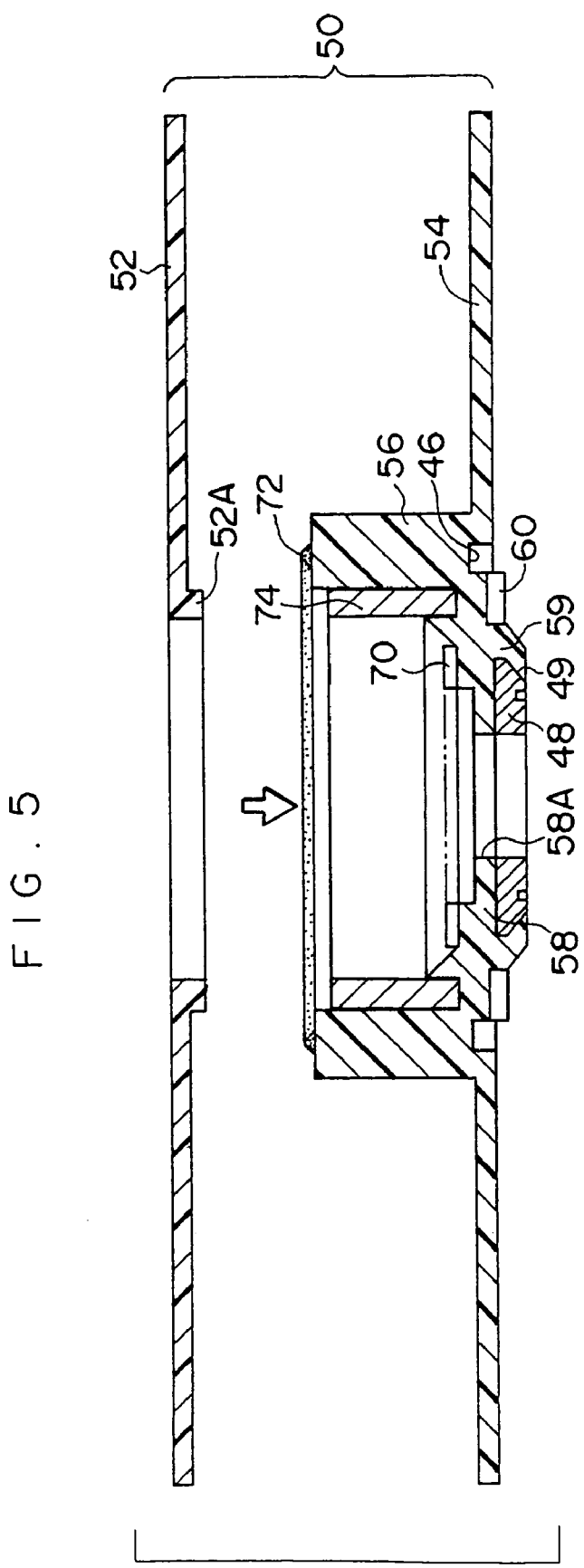
FIG. 5 is an exploded side sectional view of the reel of FIG. 1.

Next, the reel 50 relating to the present invention will be described in detail. Note that repeat explanation will not be given of portions which have been described above. As shown in FIGS. 3 through 5, the reel hub 56 and the lower flange 54, which structure the reel 50, are molded integrally of a resin material. A welding material 72 for ultrasonic welding, which is substantially triangular in cross-section, is provided at the distal end surface (the top surface) of the reel hub 56. The upper flange 52 is placed on the peak portion of this welding material 72, and by melting the welding material 72 by ultrasonic waves, the upper flange 52 is welded onto the distal end surface (the top surface) of the reel hub 56 such that the reel 50 is formed.

The reel hub 56 and the upper flange 52 are molded by using resin materials which are compatible with one another. In this way, the reel hub 56 and the upper flange 52 can be welded together by ultrasonic waves. Examples of the types of resin materials are combinations such as polymethyl methacrylate (PMMA) and acrylonitrile-butadiene-styrene (ABS), acrylonitrile-styrene (AS) and ABS, polycarbonate (PC) and PC, and the like.

As described above, the metal plate 48 is provided at the inner side of the reel gear 60. As shown in FIG. 6, the metal plate 48 is inserted and integrally molded in a mold 90 which molds the reel hub 56 and the lower flange 54. A stationary retainer plate 92 and a movable retainer plate 94 are provided at the mold 90. In the state in which the metal plate 48 is fixed to the stationary retainer plate 92, the mold 90 is clamped, and a molding material (resin material) is filled into a cavity 98 formed by the stationary retainer plate 92 and the movable retainer plate 94.

An annular concave portion 47 is provided in one end side (the bottom surface side) of the metal plate 48. When the metal plate 48 is set at the stationary retainer plate 92, the annular concave portion 47 fits with an annular convex portion 96 formed at the stationary retainer plate 92, and the metal plate 48 is positioned and fixed at the stationary retainer plate 92. Further, an annular taper portion 49 serving as a portion to be chucked is provided at the peripheral edge portion of one end side (the bottom surface side) of the metal plate 48.

In the state in which the metal plate 48 is set at the stationary retainer plate 92, there is a gap between the taper portion 49 of the metal plate 48 and the stationary retainer plate 92. At the time of molding, due to the molding material (resin material) flowing into this gap, an annular claw portion 59, which serves as a chuck portion (i.e., chamfer portion) which chucks the outer peripheral edge of the metal plate 48, is formed at the reel hub 56.

Due to the claw portion 59 being caused to chuck the taper portion 49 of the metal plate 48, the metal plate 48 becomes integral with the reel hub 56 and the lower flange 54. Note that, as long as the metal plate 48, and the reel hub 56 and the lower flange 54 can be made integral by insert molding, any structure suffices, and the present invention is not limited to the illustrated structure.

Further, as shown in FIGS. 4 and 5, a ring-shaped member 74 formed of metal (and hereinafter called "metal ring") is inserted into the inner side of the reel hub 56 so as to contact the inner peripheral surface of the reel hub 56. The material of the metal ring 74 can be appropriately selected in accordance with the resin material used for the reel hub 56 and the configuration (such as the thickness and the like) of the reel hub 56. However, a non-magnetic stainless material is particularly preferable.

Further, the distal end surface (top surface) of the metal ring 74 is formed to a height which reaches a position which is a predetermined length lower than the distal end surface (top surface) of the reel hub 56. A boss 52A of the same height as this predetermined length is formed at the bottom surface of the upper flange 52. In the state in which the upper flange 52 is placed on the peakportion of the welding material 72, the boss 52A engages (contacts) the inner peripheral surface of the reel hub 56.

Accordingly, in this state, when the upper flange 52 is welded to the distal end surface (top surface) of the reel hub 56 by ultrasonic welding, the distal end surface (bottom surface) of the boss 52A and the distal end surface (top surface) of the metal ring 74 abut one another. In this way, the metal ring 74 cannot be removed, and movement thereof is restricted. Note that it is preferable to form an annular concave portion 71, into which the bottom end of the metal ring 74 is inserted (fit), at the bottom portion of the inner peripheral surface side of the reel hub 56. By fitting the bottom end of the metal ring 74 into the annular concave portion 71, the metal ring 74 is stably held within the reel hub 56.

By providing the metal ring 74 within the reel hub 56, the strength of the reel hub 56 can be improved. Namely, as compared with resin, metal has a lower coefficient of linear expansion and hardly deforms at all. Thus, even if, due to changes in the environment such as the temperature or the humidity or the like, the resin reel hub 56 itself deforms, or the magnetic tape 12 contracts in the winding/tightening direction and attempts to deform the reel hub 56, deformation of the reel hub 56 can be suppressed by the metal ring 74 which is inserted in the reel hub 56 so as to contact the inner peripheral surface of the reel hub 56.

Accordingly, the reel hub 56 which has high dimensional accuracy can be obtained, and the magnetic tape 12 wound therearound is not adversely affected. Moreover, because the metal ring 74 is provided at the inner side of the reel hub 56, the magnetic tape 12 is not adversely affected due to time being required in order for the temperature of the metal ring 74 to fall.

As shown in FIGS. 3 through 5, it is most preferable that the metal ring 74 is inserted such that the entire outer peripheral surface of the metal ring 74 contacts the inner peripheral surface of the reel hub 56. However, as shown in FIGS. 7A and 7B, it suffices for at least one portion of the outer peripheral surface of the metal ring 74 to contact the substantially central portion, in the heightwise direction, of the inner peripheral surface of the reel hub 56.

Figure 7A:
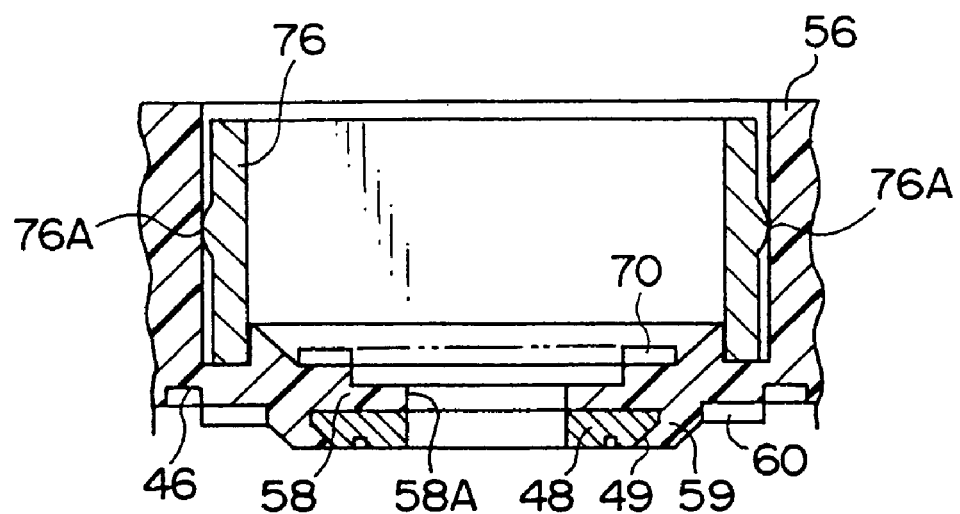
FIG. 7A is a schematic side sectional view showing a modified example of a ring of the reel relating to the embodiment of the present invention.

Namely, a projection portion 76A, which projects out slightly in an annular shape, is formed at a portion of the outer peripheral surface of a metal ring 76 shown in FIG. 7A. When the metal ring 76 is inserted within the reel hub 56, this projection portion 76A contacts the substantially central portion, in the heightwise direction, of the inner peripheral surface of the reel hub 56.

Figure 7B:
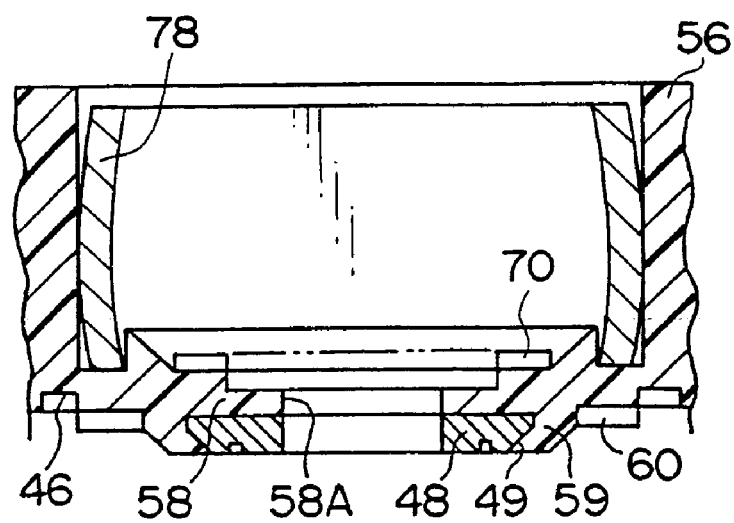
FIG. 7B is a schematic side sectional view showing another modified example of the ring of the reel relating to the embodiment of the present invention.

A metal ring 78 shown in FIG. 7B is formed in a so-called barrel shape in which the outer diameter gradually increases from the both upper and lower end portions in the heightwise direction toward the central portion. When the metal ring 78 is inserted within the reel hub 56, the substantially central portion of the metal ring 78, which is the portion thereof which protrudes out the most, contacts the substantially central portion, in the heightwise direction, of the inner peripheral surface of the reel hub 56.

When the metal ring 76 or the metal ring 78 is used, even if, for example, the reel hub 56 attempts to deform due to some effect (cause), deformation of the heightwise direction substantially central portion of the inner peripheral surface of the reel hub 56 is suppressed by the metal ring 76 or the metal ring 78. Thus, even if the reel hub 56 deforms, it becomes a substantial barrel-shape.

Accordingly, the magnetic tape 12 is wound around along the substantially barrel-shaped reel hub 56 in a state in which the central portion of the magnetic tape 12 is slightly warped toward the outer side. Thus, shifting of the magnetic tape 12 in the vertical direction is suppressed, and the wound posture of the magnetic tape 12 is good. Further, the conveying of the magnetic tape 12 at the time of drawing-out or at the time of rewinding is stable. Accordingly, in this case as well, the reel hub 56 which has high dimensional accuracy is obtained, and the magnetic tape 12 wound thereon is not adversely affected.

Figure 8:
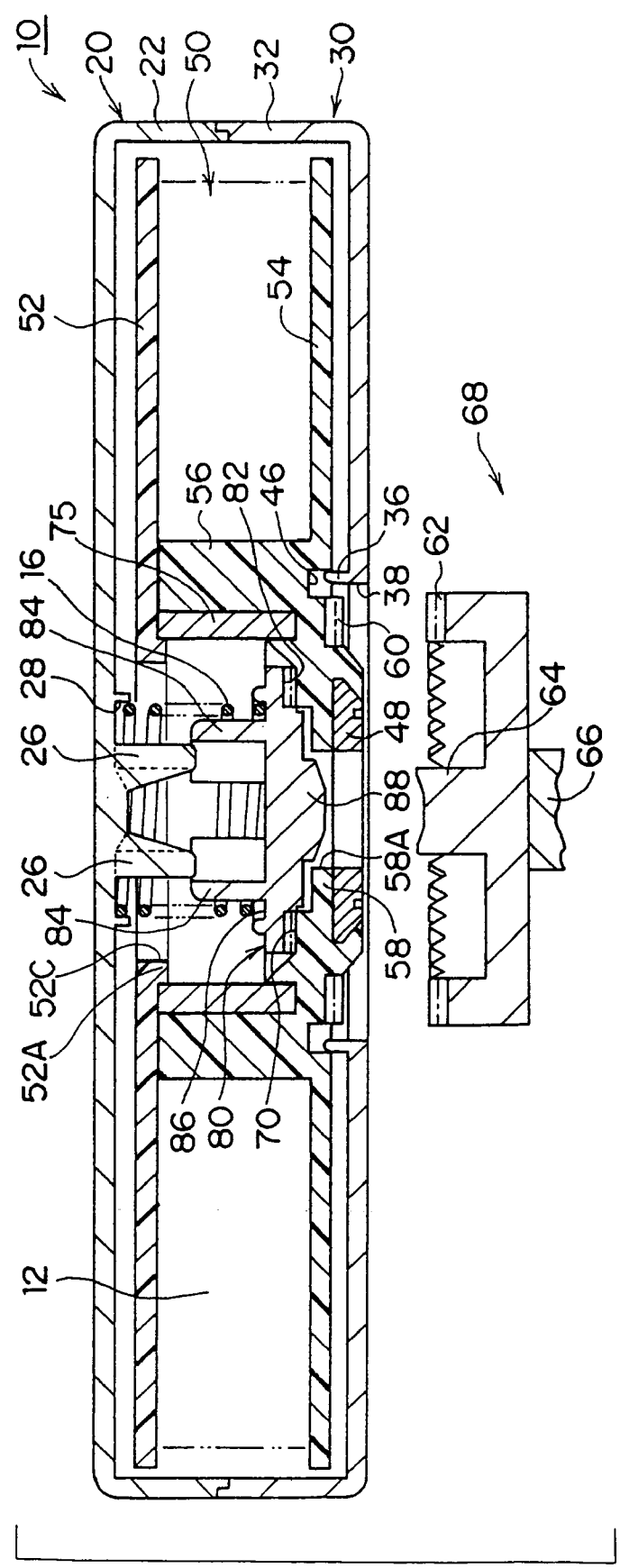
FIG. 8 is a side sectional view of a driving device of a drive device and a magnetic tape cartridge provided with yet another modified example of the ring of the reel relating to the embodiment of the present invention.
Figure 9A:
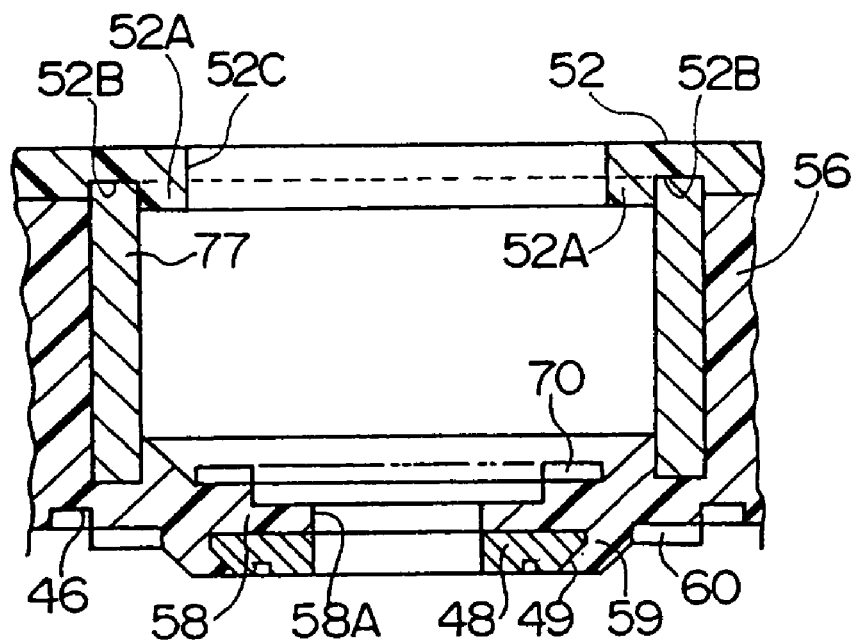
FIG. 9A is a schematic side sectional view showing still yet another modified example of the ring of the reel relating to the embodiment of the present invention.

Note that the heights of the metal rings 74, 76, 78 are not limited to those shown in FIGS. 3 through 7B. For example, as with a metal ring 75 shown in FIG. 8, the height of the metal ring 75 may be formed to be the same height as the reel hub 56. Or, as with a metal ring 77 shown in FIG. 9A, the metal ring 77 may be formed to be slightly taller than the reel hub 56 so as to be able to support the entire reel hub 56.

In such cases, a center hole 52C of the upper flange 52 is made to have a diameter which is smaller by an amount corresponding to the thickness of the metal ring 75 or the metal ring 77, so that the boss 52A can engage the inner peripheral surface of the upper portion of the metal ring 75 or the metal ring 77. Moreover, in the case of the metal ring 77 which projects further than the distal end surface (the top surface) of the reel hub 56, an annular concave portion 52B, in which the distal end portion of the metal ring 77 can fit, is formed at the outer peripheral side of the boss 52A, such that the distal end surface (the top surface) of the metal ring 77 is covered by the upper flange 52.

Figure 9B:
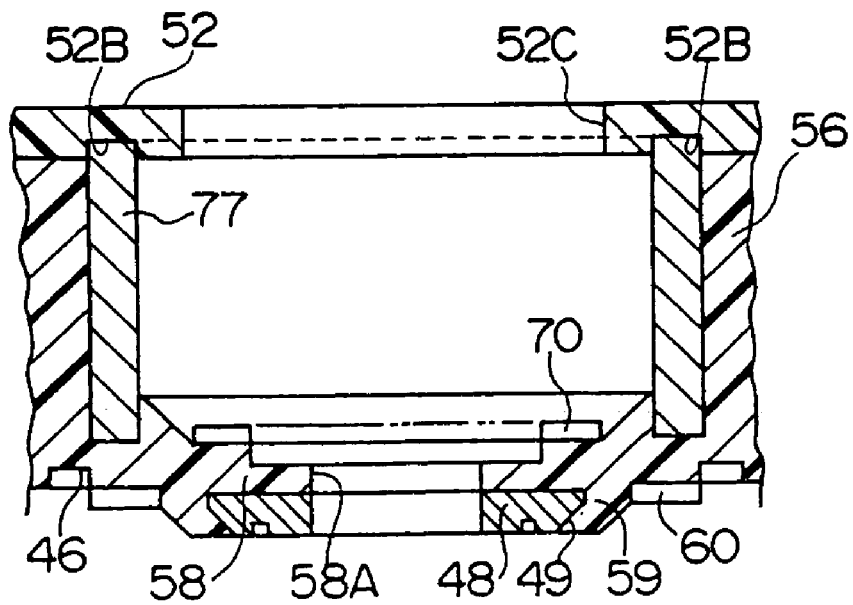
FIG. 9B is a schematic side sectional view showing a modified example of the reel of FIG. 9A.

Accordingly, in the same way as described above, the metal rings 75, 77 cannot be removed, and movement thereof is restricted. Further, when such an annular concave portion 52B is provided, positioning of the upper flange 52 with respect to the reel hub 56 can be carried out by the metal ring 77 and the annular concave portion 52B. Thus, as shown in FIG. 9B, there is the advantage that the boss 52A does not have to be provided at the upper flange 52.

As described above, in accordance with the present invention, the strength of the hub can be increased and deformation thereof can be suppressed by the ring-shaped member which is formed of metal and provided at the inner side of the hub. Accordingly, a hub having high dimensional accuracy can be obtained, and the recording tape wound therearound is not adversely affected.

What is claimed is:

1. A reel comprising:
   a cylindrical hub, which is molded of a resin material, and around which a recording tape is wound;
   a pair of flanges provided at end portions of the hub, and holding transverse direction end portions of the recording tape; and
   a ring-shaped member formed of metal and disposed at an inner side of the hub, at least one portion of an outer peripheral surface of the ring-shaped member contacting an inner peripheral surface of the hub,
   wherein an outer dimension of the ring-shaped member increases from both end portions of the ring-shaped member toward a central portion.

2. The reel of claim 1, wherein one of the flanges is formed integrally with one end portion of the hub, and another of the flanges is fit with another end portion of the hub.

3. The reel of claim 2, wherein the one of the flanges has a concave portion into which one end portion of the ring-shaped member fits.

4. The reel of claim 3, wherein, when the one end portion of the ring-shaped member is fit into the concave portion of the one of the flanges, the other end portion of the hub projects further than another end portion of the ring-shaped member.

5. The reel of claim 3, wherein, when the one end portion of the ring-shaped member is fit into the concave portion of the one of the flanges, another end portion of the ring-shaped member is flush with the other end portion of the hub.

6. The reel of claim 3, wherein, when the one end portion of the ring-shaped member is fit into the concave portion of the one of the flanges, another end portion of the ring-shaped member projects further than the other end portion of the hub.

* * * * *